US008300095B2

(12) United States Patent
Ogihara et al.

(10) Patent No.: US 8,300,095 B2
(45) Date of Patent: Oct. 30, 2012

(54) IMAGE ACQUISITION APPARATUS, METHOD FOR CONTROLLING IMAGE ACQUISITION APPARATUS, AND MICROSCOPE SYSTEM

(75) Inventors: Tomoharu Ogihara, Tokyo (JP); Hideyuki Masuyama, Tokyo (JP)

(73) Assignee: Olympus Corporation, Tokyo (JP)

( * ) Notice: Subject to any disclaimer, the term of this patent is extended or adjusted under 35 U.S.C. 154(b) by 218 days.

(21) Appl. No.: 12/765,325

(22) Filed: Apr. 22, 2010

(65) Prior Publication Data
US 2010/0289888 A1 Nov. 18, 2010

(30) Foreign Application Priority Data

May 14, 2009 (JP) ................................ 2009-118050

(51) Int. Cl.
*H04N 5/228* (2006.01)
*H04N 7/18* (2006.01)

(52) U.S. Cl. ....... 348/79; 348/222.1; 359/385; 359/376; 359/268; 359/368; 356/615; 362/268; 362/257

(58) Field of Classification Search .................... 348/79, 348/80, 222.1; 382/276; 359/385–390, 376, 359/368, 268; 356/615; 362/268, 257
See application file for complete search history.

(56) References Cited

U.S. PATENT DOCUMENTS

| 5,402,171 | A | 3/1995 | Tagami et al. |
| 5,682,567 | A | 10/1997 | Spruck et al. |
| 6,822,805 | B2 * | 11/2004 | Kurata ........................... 359/656 |
| 6,947,074 | B2 * | 9/2005 | Koseki et al. .............. 348/240.1 |
| 7,095,556 | B2 * | 8/2006 | Iketaki et al. ................. 359/385 |
| 7,205,531 | B2 * | 4/2007 | Watanabe et al. ............. 250/234 |
| 7,355,701 | B2 * | 4/2008 | Ishibashi ........................ 356/300 |
| 7,411,626 | B2 * | 8/2008 | Ueda ............................. 348/364 |
| 7,476,873 | B2 * | 1/2009 | Hayashi ....................... 250/458.1 |
| 7,589,891 | B2 * | 9/2009 | Kawasaki ..................... 359/368 |
| 7,630,065 | B2 * | 12/2009 | Suzuki et al. .................... 356/73 |
| 7,756,357 | B2 * | 7/2010 | Yoneyama .................... 382/280 |
| 2002/0176007 | A1 | 11/2002 | Cappellaro |
| 2004/0017487 | A1 | 1/2004 | Ueda |
| 2004/0227101 | A1 * | 11/2004 | Iketaki et al. .............. 250/458.1 |
| 2005/0002587 | A1 * | 1/2005 | Yoneyama .................... 382/254 |
| 2005/0161592 | A1 * | 7/2005 | Watanabe et al. ............. 250/234 |
| 2006/0109461 | A1 * | 5/2006 | Ishibashi ........................ 356/318 |
| 2008/0158566 | A1 * | 7/2008 | Suzuki et al. ................. 356/450 |

FOREIGN PATENT DOCUMENTS

| JP | 6-225317 | 8/1994 |
| JP | 2003-283887 | 10/2003 |

OTHER PUBLICATIONS

Extended European Search Report dated Aug. 24, 2010.

* cited by examiner

*Primary Examiner* — Haresh N Patel
(74) *Attorney, Agent, or Firm* — Scully, Scott, Murphy & Presser, P.C.

(57) ABSTRACT

A pixel shifting unit moves the relative position between the luminous flux entering an image pickup device and the device to a plurality of predetermined positions in a predetermined order. A control unit controls the device, and allows the image of a subject image formed by the luminous flux on the photoreception surface of the device when the relative position is in any of the plurality of predetermined positions. A combination unit combines the plurality of obtained images to generate a high-resolution image. A prediction unit predicts a shooting environment when the device hereafter shoots an image of the subject image on the basis of a change of at least two images. A setting control unit controls a setting of a shooting condition when the image of the subject image is shot on the basis of a result of the prediction of the shooting environment.

7 Claims, 16 Drawing Sheets

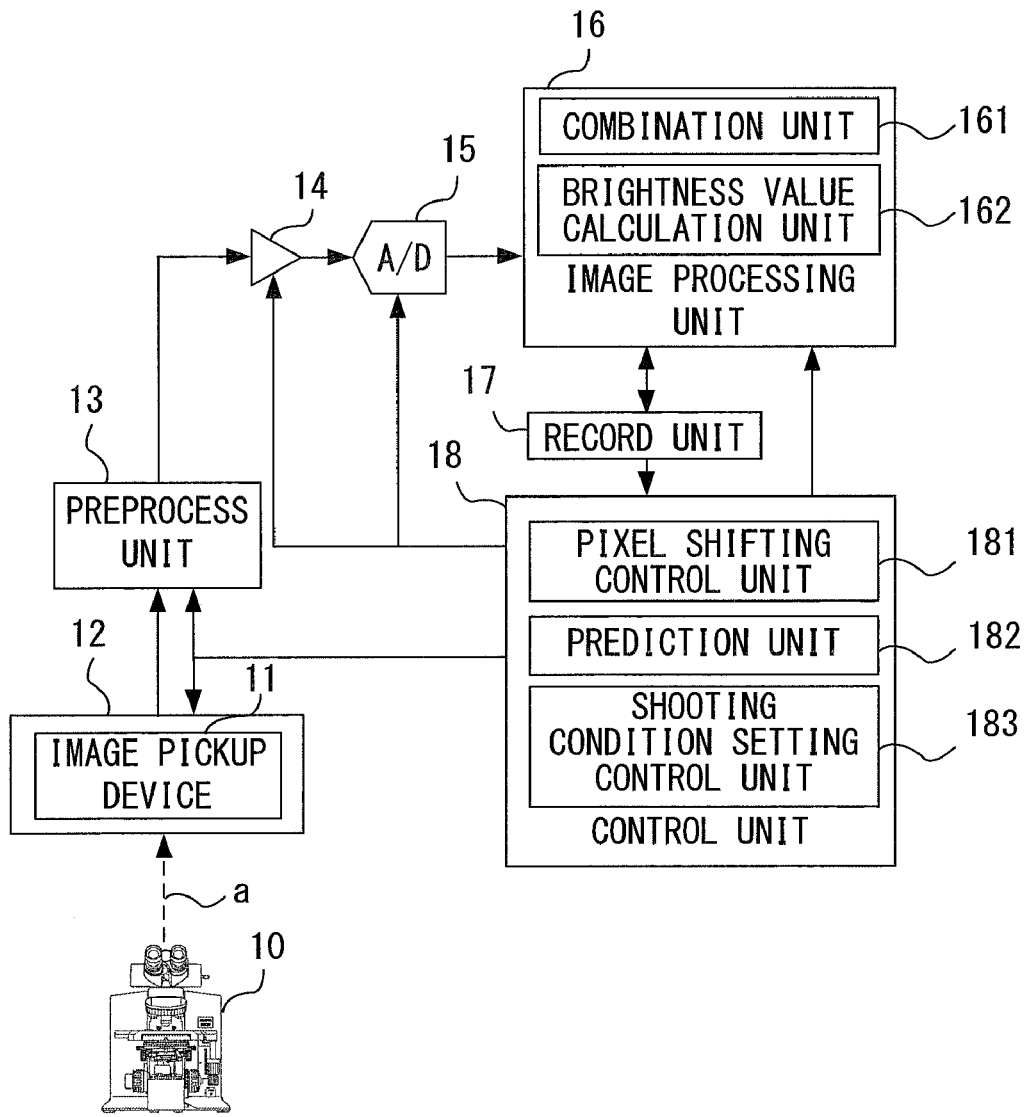
F I G. 1

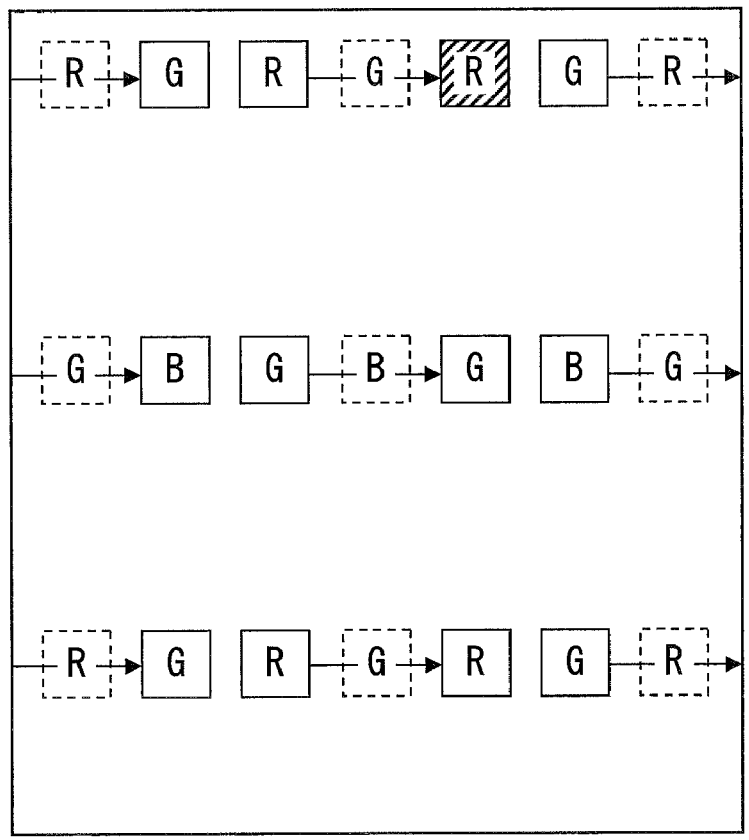
F I G. 2 C

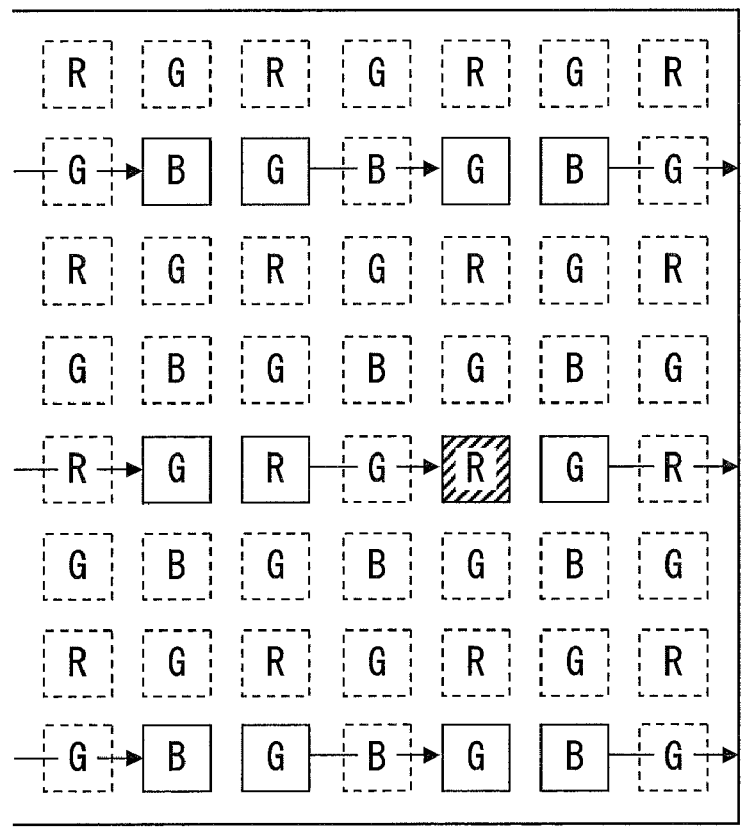
F I G. 2 I

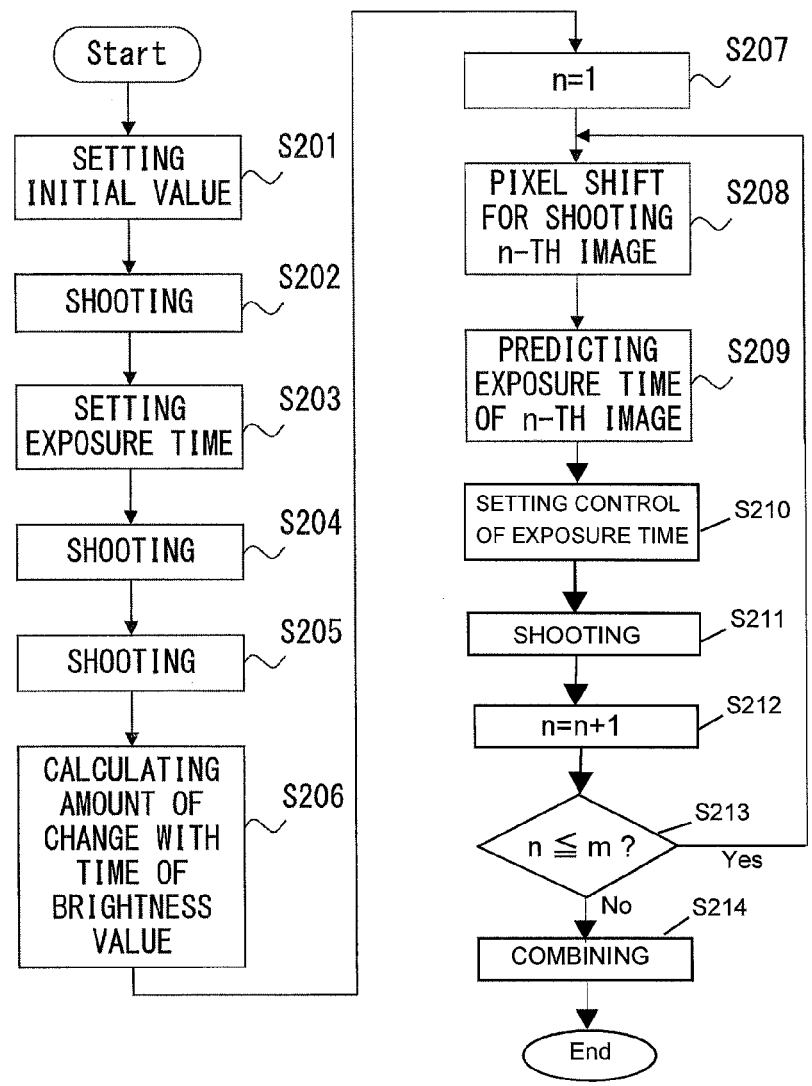
F I G. 3

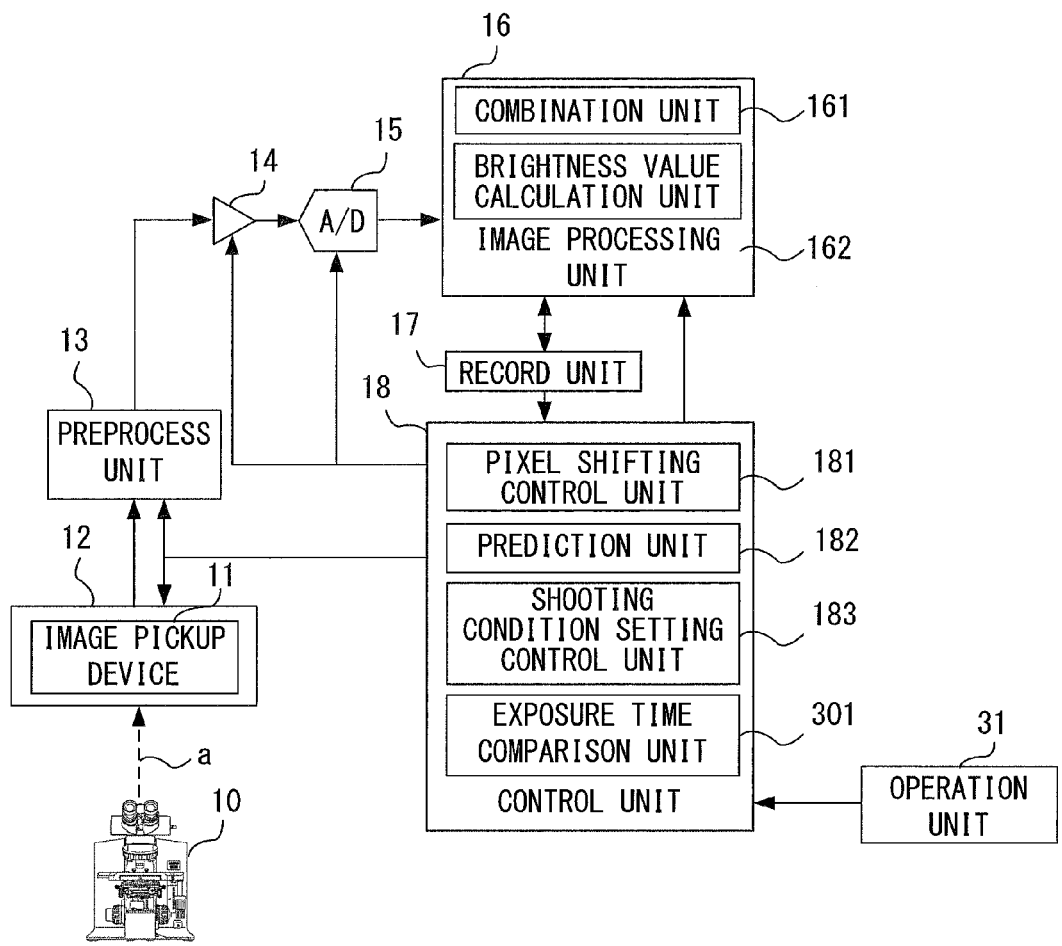
F I G. 4

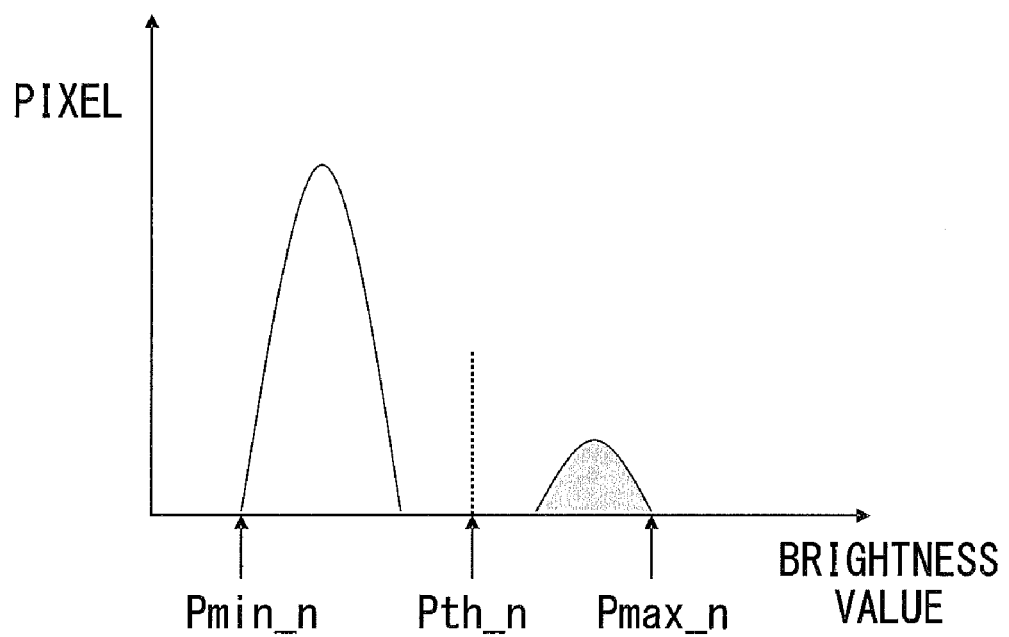
F I G. 8

IMAGE ACQUISITION APPARATUS, METHOD FOR CONTROLLING IMAGE ACQUISITION APPARATUS, AND MICROSCOPE SYSTEM

CROSS-REFERENCE TO RELATED APPLICATIONS

This application claims benefit of Japanese Application No. 2009-118050, filed May 14, 2009, the contents of which are incorporated by this reference.

BACKGROUND OF THE INVENTION

1. Field of the Invention

The present invention relates to the technology of acquiring an image, and more specifically to the technology of acquiring a high-resolution image.

2. Description of the Related Art

For example, when a sample image observed by a microscope is captured, capturing a high-resolution image can be desired depending on the type of a sample to be captured. On the other hand, in an image acquisition apparatus for recording an optically captured image as digital data such as an electronic camera etc., the resolution of an image is determined by the number of pixels of the image pickup device used for the image acquisition apparatus. However, an image acquisition apparatus provided with a high-resolution image pickup device is generally expensive.

The technology of capturing a high-resolution image without increasing the number of pixels of an image pickup device is disclosed by, for example, the Japanese Laid-open Patent Publication No. 6-225317 and the Japanese Laid-open Patent Publication No. 2003-283887. In the technology, a high-resolution image is acquired using a plurality of images captured by shifting pixels. The technology is to perform image processing on an image captured without shifting pixels using a plurality of images captured by shifting the spatial relative position between an optical image formed on an image pickup device and the image pickup device by a pitch of one or less pixel, and acquires an image of the resolution of the number of pixels higher than the image pickup device. However, since a pixel shifting operation and an image acquiring operation are repeated in the technology, an appropriate image may not be acquired for a subject whose aspect changes with the lapse of time. For example, when a subject is a fluorescent observation sample, a long exposure time is required to acquire an image of pumping light of a smaller quantity of light, and fading gradually grows with the lapse of time after the pumping. Therefore, when an image of a fluorescent observation sample is acquired in the pixel shifting method, unevenness may occur on the acquired image.

SUMMARY OF THE INVENTION

The image acquisition apparatus according to an aspect of the present invention includes: a pixel shifting unit moving the relative position between a luminous flux entering an image pickup device and the image pickup device to a plurality of predetermined positions in a predetermined order; a shooting unit shooting an image of a subject image formed by the luminous flux on a photoreception surface of the image pickup device when the relative position is placed in any of the plurality of predetermined positions; a high-resolution image generation unit combining a plurality of images obtained by shooting the images by the shooting unit and generating a high-resolution image of the subject having higher resolution than the images; a prediction unit predicting a shooting environment when the shooting unit afterwards shoots the images of the subject on the basis of a change of at least two images obtained by shooting the images by the shooting unit; and a shooting condition setting control unit controlling a setting of a shooting condition when the shooting unit shoots an image of the subject image on the basis of a result of predicting the shooting environment by the prediction unit.

A method of controlling an image acquisition apparatus according to another aspect of the present invention is used with the image acquisition apparatus including: a pixel shifting unit moving the relative position between a luminous flux entering an image pickup device and the image pickup device to a plurality of predetermined positions in a predetermined order; a shooting unit shooting an image of a subject image formed by the luminous flux on a photoreception surface of the image pickup device when the relative position is placed in any of the plurality of predetermined positions; a high-resolution image generation unit combining a plurality of images obtained by shooting the images by the shooting unit and generating a high-resolution image of the subject having higher resolution than the images, and the controlling method includes: predicting a shooting environment when the shooting unit afterwards shoots an image of the subject image on the basis of the changes of at least two images obtained by shooting the image by the shooting unit; and controlling a setting of a shooting condition when the shooting unit shoots an image of the subject image on the basis of a result of predicting the shooting environment.

A microscope system according to a further aspect of the present invention includes a microscope for obtaining a microscope image of a sample and an image acquisition apparatus for acquiring an image of the microscope image. The image acquisition apparatus includes: a pixel shifting unit moving the relative position between a luminous flux entering an image pickup device and the image pickup device to a plurality of predetermined positions in a predetermined order; a shooting unit shooting an image of a subject image as the microscope image formed by the luminous flux on a photoreception surface of the image pickup device when the relative position is placed in any of the plurality of predetermined positions; a high-resolution image generation unit combining a plurality of images obtained by shooting the images by the shooting unit and generating a high-resolution image of the subject having higher resolution than the images; a prediction unit predicting a shooting environment when the shooting unit afterwards shoots the images of the subject on the basis of a change of at least two images obtained by shooting the images by the shooting unit; and a shooting condition setting control unit controlling a setting of a shooting condition when the shooting unit shoots an image of the subject image on the basis of a result of predicting the shooting environment by the prediction unit.

BRIEF DESCRIPTION OF THE DRAWINGS

The present invention will be more apparent from the following detailed description when the accompanying drawings are referenced.

FIG. 1 is the first example of the configuration of the microscope system embodying the present invention;

FIG. 2C is an explanatory view (3) of the principle of generating a high-resolution image using a pixel shifting method;

FIG. 2I is an explanatory view (9) of the principle of generating a high-resolution image using a pixel shifting method;

FIG. 3 is a flowchart of the process contents of the controlling process performed by the control unit in FIG. 1;

FIG. 4 is the second example of the configuration of the microscope system embodying the present invention;

FIG. 8 is an example of the relationship between the brightness value of the pixel configuring an image and the number of pixels as the brightness value.

DESCRIPTION OF THE PREFERRED EMBODIMENTS

Figure 2A:
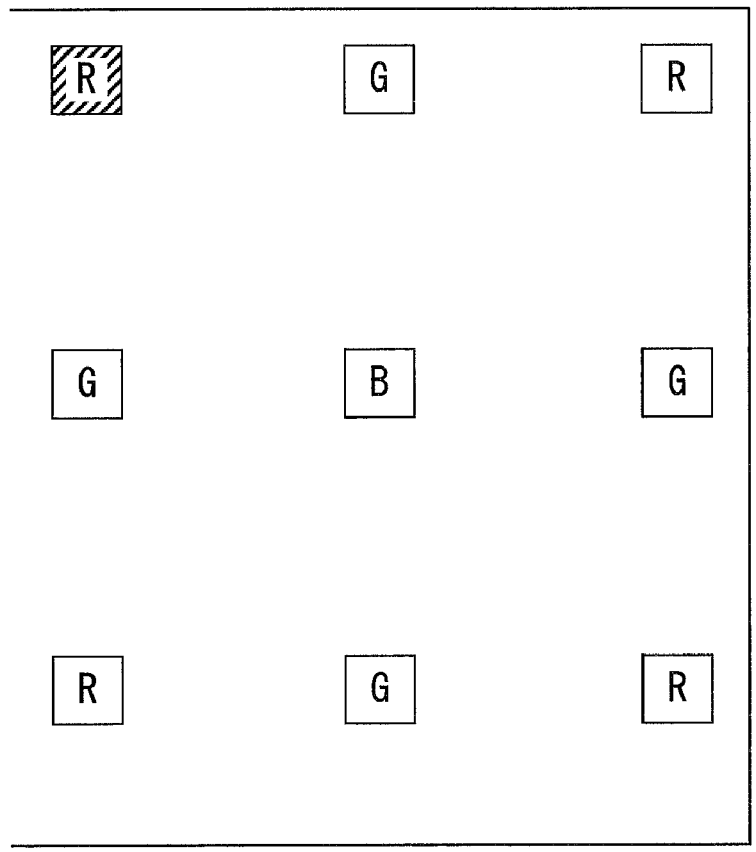
FIG. 2A is an explanatory view (1) of the principle of generating a high-resolution image using a pixel shifting method.

The embodiments of the present invention are described below with reference to the attached drawings.

In the embodiments, it is assumed that a fluorescent observation sample is used as a sample to be observed, and the microscope system including the image acquisition apparatus for acquiring an image of a microscope image of the sample is described below.

The example in FIG. 1 is described first. FIG. 1 is the first example of the configuration of the microscope system embodying the present invention.

In the microscope system, an image acquisition apparatus is configured by an image pickup device 11, a pixel shifting unit 12, a preprocess unit 13, an amplifier unit 14, an A/D conversion unit 15, an image processing unit 16, a record unit 17, and a control unit 18. The image acquisition apparatus acquires an image of an observed image (microscope image) of a sample not illustrated in the attached drawings but is obtained by a microscope body 10.

The microscope body 10 obtains an observed image of a sample for visual observation, and externally derives a luminous flux of the observed image along the optical path for observation "a". The image pickup device 11 is arranged on the optical path for observation "a", and when the luminous flux enters the image pickup device 11, the observed image is formed on the photoreception surface of the image pickup device 11.

The image pickup device 11 is, for example, a CCD (charge coupled device). The observed image formed on the photoreception surface is captured as a subject image, and a signal of the size depending on the amount of photoreception of each pixel to the preprocess unit 13 as a signal indicating the image of the subject image. The exposure time of the image pickup device 11 is controlled by a shooting condition setting control unit 183 of the control unit 18.

The preprocess unit 13 processes the signal received from the image pickup device 11 according to the control pulse provided from the control unit 18, uses the image signal of each pixel configuring the image of the subject image, and transmits the amplifier unit 14 as output of the image pickup device 11.

The amplifier unit 14 amplifies the image signal transmitted from the preprocess unit 13 at the amplification level set by the shooting condition setting control unit 183 of the control unit 18.

The A/D conversion unit 15 converts the image signal as an analog signal amplified by the amplifier unit 14 into digital data, and outputs the image data representing the image signal.

By the above-mentioned image pickup device 11, preprocess unit 13, amplifier unit 14, and the A/D conversion unit 15, a shooting unit which shots, under the control of the control unit 18, the image of the subject image formed by the luminous flux derived from the microscope body 10 on the photoreception surface of the image pickup device 11 is configured.

In the explanation below, the image data representing the image of the subject image output from the shooting unit can also be referred to simply as an "image".

The pixel shifting unit 12 moves the image pickup device on the plane perpendicular to the optical path for observation "a" under the control of a pixel shifting control unit 181 of the control unit 18, and moves the relative position between the luminous flux entering the image pickup device 11 and the image pickup device 11 to a plurality of predetermined positions in a predetermined order. The control unit 18 controls the control unit when the relative position is one of the pluralities of predetermined positions, and the image of the subject image is shot.

The image processing unit 16 performs various types of image processing on the image output from the shooting unit and a record control process by the record unit 17 on the image under the control of the control unit 18. Relating to the image processing, the image processing unit 16 is specifically provided with a combination unit 161 and a brightness value calculation unit 162.

The combination unit 161 performs, for example, a high-resolution image generating process for generating a high-resolution image of the subject having higher resolution than the images by combining a plurality of images obtained by shooting by the shooting unit.

The brightness value calculation unit 162 calculates the brightness value of an image obtained by shooting by the shooting unit, the average brightness value of all or a part of the pixels configuring the image, etc.

The image processing unit 16 can be configured by, for example, a CPU and a memory. The CPU (central processing unit) provides the function of the above-mentioned image processing unit 16 by reading and executing a predetermined image processing program stored in advance in read-only memory. The memory is used as a temporary storage area for operations when the CPU executes the image processing program.

The record unit 17 records and stores a shot image of the shooting unit, an image obtained by performing the image processing by the image processing unit 16, an operation result of the brightness value calculation unit 162, etc.

The control unit 18 controls the entire image acquisition apparatus. Relating to the control, the control unit 18 is specifically provided with the pixel shifting control unit 181, a prediction unit 182, and the shooting condition setting control unit 183.

The pixel shifting control unit 181 controls the pixel shifting unit 12, moves the image pickup device 11, and moves the relative position between the luminous flux entering the image pickup device 11 and the image pickup device 11 to a plurality of predetermined positions in a predetermined order.

The prediction unit 182 predicts the amount of light of the luminous flux entering the image pickup device 11, as the prediction of the shooting environment when the shooting unit afterwards shoots an image of a subject image, on the basis of changes of at least two images obtained by a shooting process by the shooting unit. To be more practical, the prediction unit 182 predicts the change with time of the amount of light of the luminous flux by fading on the fluorescent observation sample after pumping on the basis of the change of the brightness value in at least two images obtained by the shooting operation by the shooting unit and the shooting interval of the image by the shooting unit.

The shooting condition setting control unit 183 controls the setting of a shooting condition when the shooting unit shoots an image of a subject image on the basis of the result of the prediction of the shooting environment by the prediction unit 182. To be more practical, the shooting condition setting control unit 183 controls the setting of exposure, as the control of the setting of the shooting condition, when the shooting unit hereafter shoots an image of a subject image.

The control unit 18 can be configured by, for example, a CPU and memory. The CPU (central processing unit) provides the function of the control unit 18 by reading and executing a predetermined control program stored in advance in read-only memory. The memory is also used as a temporary storage area for work when the CPU executes a control program.

Next, the principle of generating a high-resolution image using a pixel shifting method performed by the control unit 18 controlling the pixel shifting unit 12 and the combination unit 161 is described with reference to each of FIGS. 2A through 2I. The generating method is similar to the technology disclosed in the above-mentioned document, that is, the Japanese Laid-open Patent Publication No. 2003-281887.

Each of FIGS. 2A through 2I is a schematic diagram of a part of the arrangement of the photoreceptor of the image pickup device 11. In each figure, one square indicates one pixel, and the squares are arranged at 1-pixel pitch intervals. The squares "R", "G", and "B" are respectively a photoreceptor for generating brightness data of red by an R filter, a photoreceptor for generating brightness data of green by a G filter, and a photoreceptor for generating brightness data of blue by a B filter, Each of FIGS. 2A through 2I is an explanatory view of an aspect of moving the image pickup device 11, and does not correctly indicate the size, the interval, the amount of movement, etc.

First, the pixel shifting control unit 181 of the control unit 18 controls the pixel shifting unit 12, and moves the image pickup device 11 to the first position as the initial position. FIG. 2A indicates the arrangement of the initial position.

The control unit 18 controls the shooting unit to shoot a subject image when the image pickup device 11 is arranged at the first position, and further controls the image processing unit 16 to record the image obtained by the shooting process in the record unit 17 as a "first image".

Figure 2B:
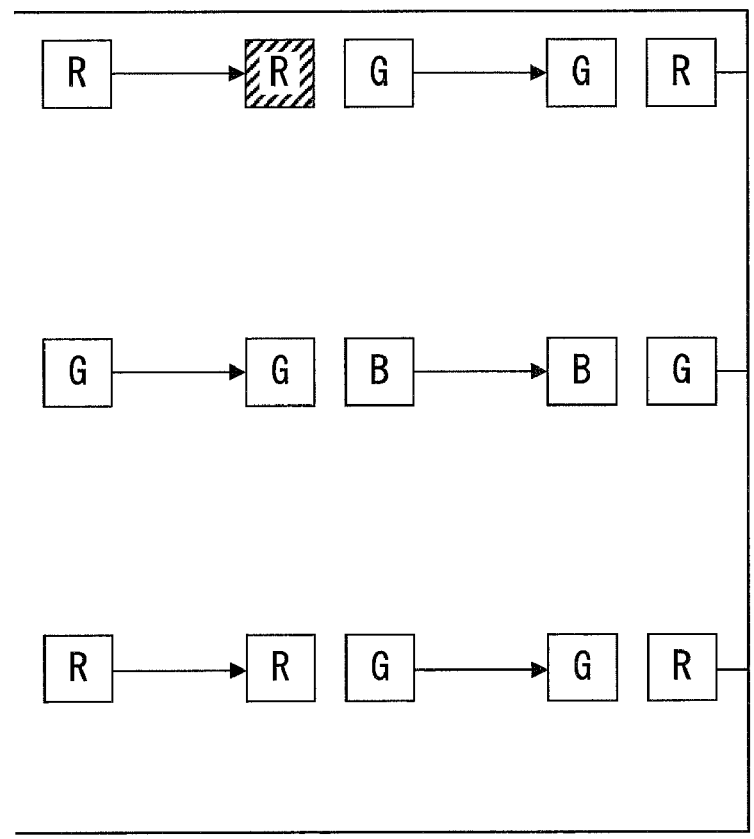
FIG. 2B is an explanatory view (2) of the principle of generating a high-resolution image using a pixel shifting method.

Next, the pixel shifting control unit 181 controls the pixel shifting unit 12, and performs a pixel shift for moving the image pickup device 11 by ⅔ pixel from the first position horizontally to right. FIG. 2B indicates the arrangement in the second position after the pixel shift. In each figure in and after FIG. 2B, the square from which an arrow starts refers to the position of the photoreceptor before the pixel shift, and the square at which the arrow arrives refers to the position of the image pickup device 11 after the pixel shift.

The control unit 18 controls the shooting unit to shoot a subject image when the image pickup device 11 is arranged at the second position, and further controls the image processing unit 16 to record the image obtained by the shooting process in the record unit 17 as a "second image".

Next, the pixel shifting control unit 181 controls the pixel shifting unit 12, and performs a pixel shift for moving the image pickup device 11 by ⅔ pixel from the second position horizontally to right. FIG. 2C indicates the arrangement in the third position after the pixel shift.

The control unit 18 controls the shooting unit to shoot a subject image when the image pickup device 11 is arranged at the third position, and further controls the image processing unit 16 to record the image obtained by the shooting process in the record unit 17 as a "third image".

Figure 2D:
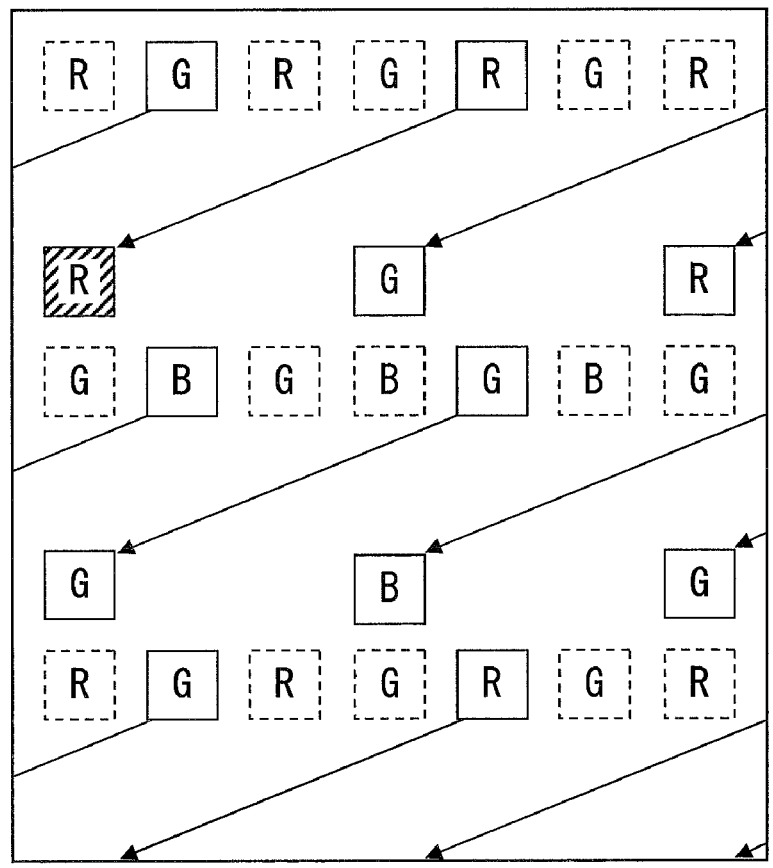
FIG. 2D is an explanatory view (4) of the principle of generating a high-resolution image using a pixel shifting method.

Next, the pixel shifting control unit 181 controls the pixel shifting unit 12, and performs a pixel shift for moving the image pickup device 11 by 4/3 pixel horizontally to left and downward by ⅔ pixel vertically from the third position. FIG. 2D indicates the arrangement in the fourth position after the pixel shift.

The control unit 18 controls the shooting unit to shoot a subject image when the image pickup device 11 is arranged at the fourth position, and further controls the image processing unit 16 to record the image obtained by the shooting process in the record unit 17 as a "fourth image".

Figure 2E:
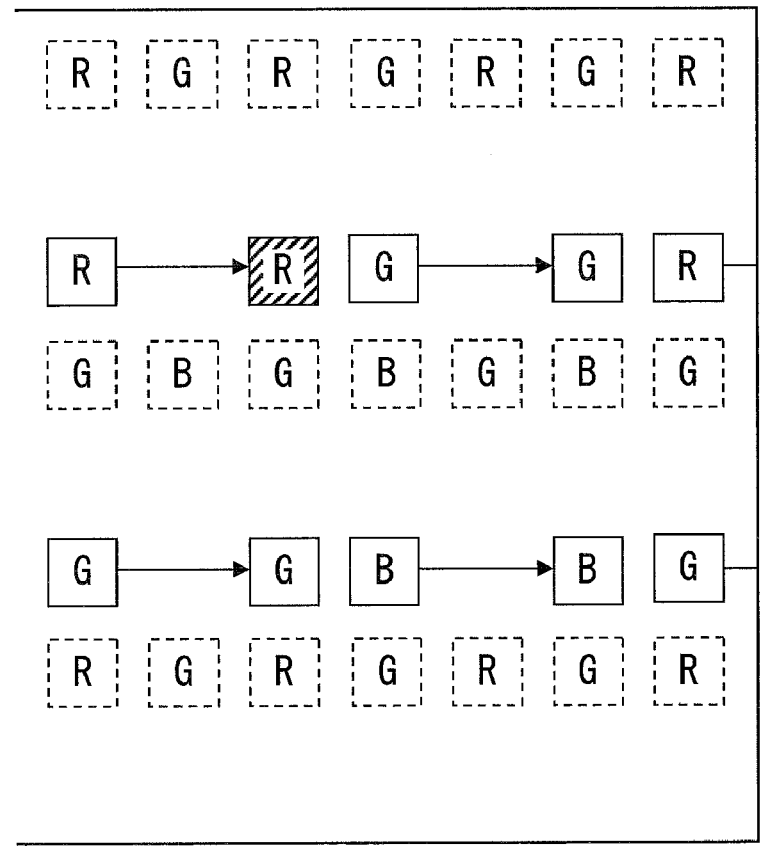
FIG. 2E is an explanatory view (5) of the principle of generating a high-resolution image using a pixel shifting method.

Next, the pixel shifting control unit 181 controls the pixel shifting unit 12, and performs a pixel shift for moving the image pickup device 11 by ⅔ pixel from the fourth position horizontally to right. FIG. 2E indicates the arrangement in the fifth position after the pixel shift.

The control unit 18 controls the shooting unit to shoot a subject image when the image pickup device 11 is arranged at the fifth position, and further controls the image processing unit 16 to record the image obtained by the shooting process in the record unit 17 as a "fifth image".

Figure 2F:
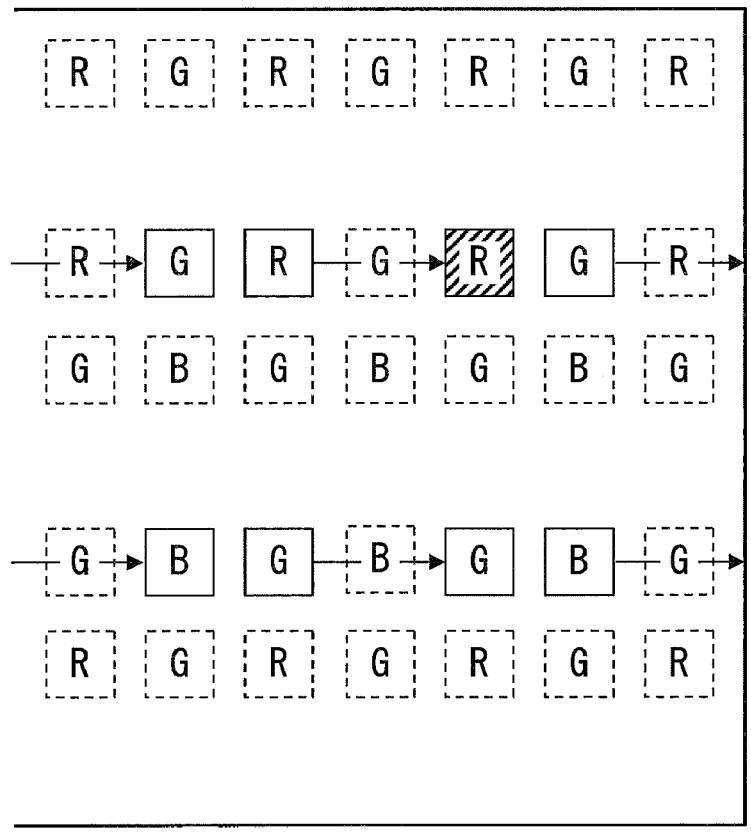
FIG. 2F is an explanatory view (6) of the principle of generating a high-resolution image using a pixel shifting method.

Next, the pixel shifting control unit 181 controls the pixel shifting unit 12, and performs a pixel shift for moving the image pickup device 11 by ⅔ pixel from the fifth position horizontally to right. FIG. 2F indicates the arrangement in the sixth position after the pixel shift.

The control unit 18 controls the shooting unit to shoot a subject image when the image pickup device 11 is arranged at the sixth position, and further controls the image processing unit 16 to record the image obtained by the shooting process in the record unit 17 as a "sixth image".

Figure 2G:
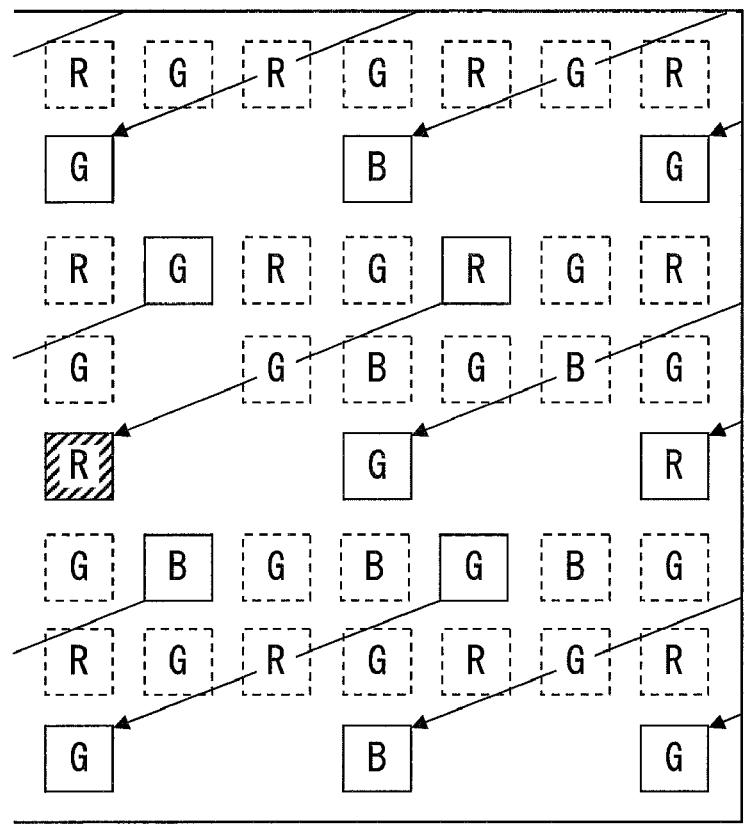
FIG. 2G is an explanatory view (7) of the principle of generating a high-resolution image using a pixel shifting method.

Next, the pixel shifting control unit 181 controls the pixel shifting unit 12, and performs a pixel shift for moving the image pickup device 11 by 4/3 pixel horizontally to left and downward by ⅔ pixel vertically from the sixth position. FIG. 2G indicates the arrangement in the seventh position after the pixel shift.

The control unit 18 controls the shooting unit to shoot a subject image when the image pickup device 11 is arranged at the seventh position, and further controls the image processing unit 16 to record the image obtained by the shooting process in the record unit 17 as a "seventh image".

Figure 2H:
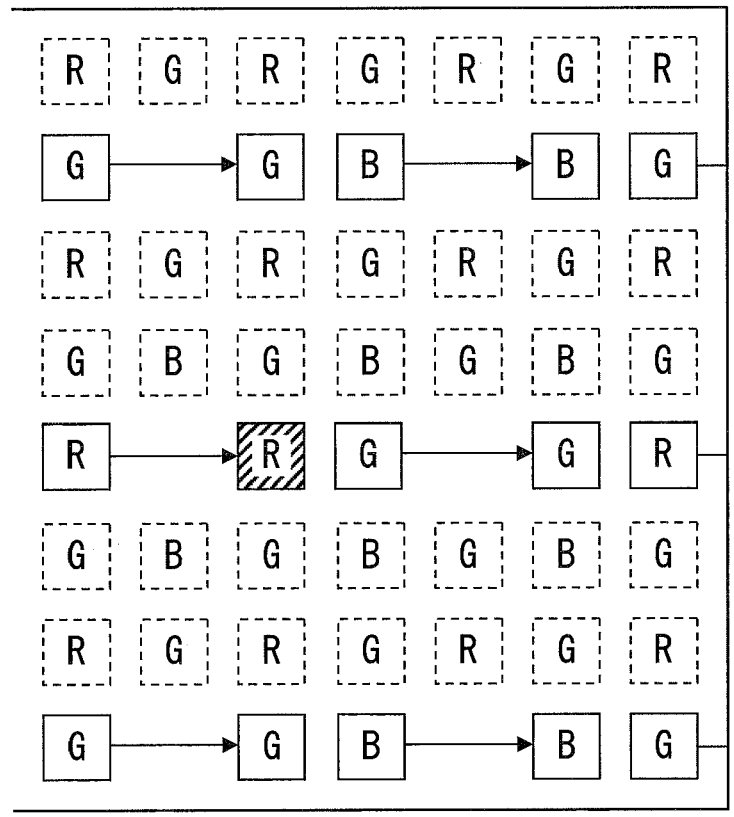
FIG. 2H is an explanatory view (8) of the principle of generating a high-resolution image using a pixel shifting method.

Next, the pixel shifting control unit 181 controls the pixel shifting unit 12, and performs a pixel shift for moving the image pickup device 11 by ⅔ pixel from the seventh position horizontally to right. FIG. 2H indicates the arrangement in the eighth position after the pixel shift.

The control unit 18 controls the shooting unit to shoot a subject image when the image pickup device 11 is arranged at the eighth position, and further controls the image processing unit 16 to record the image obtained by the shooting process in the record unit 17 as an "eighth image".

Next, the pixel shifting control unit 181 controls the pixel shifting unit 12, and performs a pixel shift for moving the image pickup device 11 by ⅔ pixel from the eighth position horizontally to right. FIG. 2I indicates the arrangement in the ninth position after the pixel shift.

The control unit 18 controls the shooting unit to shoot a subject image when the image pickup device 11 is arranged at the ninth position, and further controls the image processing unit 16 to record the image obtained by the shooting process in the record unit 17 as a "ninth image".

As described above, the pixel shifting unit 12 thus moves the image pickup device 11 and the relative position between the luminous flux entering the image pickup device 11 and the image pickup device 11 from the first position to the ninth position in the plurality of predetermined positions in a predetermined order. Then, the shooting unit shoots an image of a subject formed from the luminous flux on the photoreception surface of the image pickup device 11, and obtains the first through ninth images.

When the first through ninth images are obtained, the control unit 18 next controls the combination unit 161 of the image processing unit 16, combines the first through ninth images, and performs the high-resolution image generating process for generating a high-resolution image of the subject having higher resolution than the images. In this process, the first through ninth images are read from the record unit 17, and the brightness data of the pixels indicated in each image is arranged as illustrated in FIG. 2I, and is used as the high-resolution image of a subject.

In the microscope system illustrated in FIG. 1, a high-resolution image off a subject is generated as described above.

In generating a high-resolution image of a subject as described above, a total of nine images from the first through ninth images are combined to generating the image, and the number of images used in generating the image can be any number other than nine. In the above-mentioned example of generating the image, pixels are shifted by moving the image pickup device 11 ⅔ pixel horizontally and ⅔ pixel vertically. The amount of horizontal and vertical movement of the image pickup device 11 can be appropriately set. It is eventually necessary that a high-resolution image can be generated by relatively moving (shifting) the image pickup device 11 and the luminous flux.

The flowchart in FIG. 3 is described below. FIG. 3 is a flowchart of the controlling process performed by the control unit 18 in FIG. 1.

To allow the control unit 18 configured by a CPU and memory to perform the controlling process, a control program for directing the CPU to perform the controlling process is generated in advance and stored in read-only memory. When a predetermined execute instruction is issued to the CPU, the CPU can read the control program from the read-only memory for execution.

In FIG. 3, the processes in S201 through S203 are to calculate the exposure time in which a sample (fluorescent observation sample) as a subject is shot with appropriate exposure and set in the shooting unit. In addition, the processes in S204 through S206 are to predict a change with time of the amount of light of the luminous flux entering the image pickup device 11 by the fading of the fluorescent observation sample after pumping. The processes in S207 through S213 are to obtain necessary images for generating a high-resolution image by the shooting unit shooting the subject while controlling the setting of the exposure of the shooting unit on the basis of the prediction result of the change with time of the amount of light. The process in S214 is to allow the combination unit 161 to generate a high-resolution image of a subject on the basis of the obtained image.

It is assumed that the image pickup device 11 is placed at a predetermined position when the process in FIG. 3 is started.

In FIG. 3, first in S201, initial values are set. The process is to set the number m of images used in generating a high-resolution image, the initial value $T_{INI}$ of the exposure time $T_{EXP}$, and the initial value ("1" in this embodiment) of the amplification level Av of the amplifier unit 14.

Next, the shooting process is performed in S202. In this shooting process, the shooting unit and the image processing unit 16 are controlled, the shooting unit shoots a subject in an exposure time $T_{EXP}=T_{INI}$, and the image $D_{INI}$ obtained in the shooting process is recorded by the record unit 17. In this case, the brightness value calculation unit 162 is operated, the brightness value $Y_{INI}$ of a predetermined area in the image $D_{INI}$ is calculated, and the record unit 17 records the obtained brightness value $Y_{INI}$.

Next, in S203, the exposure time setting process is performed by the shooting condition setting control unit 183 of the control unit 18. In this process, the brightness value $Y_{INI}$ when the exposure time $T_{EXP}=T_{INI}$ is read from the record unit 17, the exposure time $T_{EXP}=T_{second}$ for appropriate exposure for the brightness value $Y_{INI}$ is obtained, and the value if set in the shooting unit. The relationship between the brightness value Y and the exposure time T for appropriate exposure is represented by data table in advance and recorded in the record unit 17. Then, the shooting condition setting control unit 183 refers to the data table and obtains the exposure time $T_{second}$ by retrieving the value associated with the brightness value $Y_{INI}$.

Next, the shooting process is performed in S204. In this shooting process, the shooting unit and the image processing unit 16 are controlled, the shooting unit shoots a subject with the exposure time $T_{EXP}=T_{second}$, and the image Da obtained in this shooting process is recorded in the record unit 17. In this case, the brightness value calculation unit 162 is operated to calculate the brightness value Ya of a predetermined area of the image Da, and the obtained brightness value Ya is recorded by the record unit 17.

Next, in S205, the shooting process is performed again. In this shooting process, when a predetermined time t passes after the subject is completely shot in the process in S204, the shooting unit is allowed to shoot a subject by setting the same exposure time ($T_{second}$) as the shooting process, and the record unit 17 records the image Db obtained in the shooting. In this case, the brightness value calculation unit 162 is operated, the brightness value Yb of the predetermined area in the image Db (the same area as the area whose brightness value Ya is calculated from the image Da) is calculated, and the obtained brightness value Yb is recorded in the record unit 17.

Next, in S206, the prediction unit 182 performs the process of calculating the amount of change with time of the brightness value. In this process, the brightness values Ya and Yb are first read from the record unit 17, and the process of calculating the amount of change $\Delta Y = Ya - Yb$ of both brightness values is performed. Next, the amount of change $\Delta Y$ of the brightness value is divided by the above-mentioned shooting interval time t, and the process of calculating the amount of change with time $\Delta YT$ of the brightness value $= \Delta Y/t$ is performed.

Next, in S207, the value of the variable n is initialized to "1".

Then, in S208, the pixel shifting unit 12 is controlled to move the image pickup device 11 to the n-th position by the pixel shifting control unit 181 of the control unit 18.

Next, in S209, the prediction unit 182 performs a predicting process. In this process, the time FT[n] from the start of the exposure for shooting the image D[n−1] to the start of the next exposure for shooting the image D[n] by the shooting unit is set. Next, the brightness value calculation unit 162 is operated to calculate the brightness value Y[n−1] of a predetermined area in the image D[n−1]. Then, the time FT[n] and the brightness value Y[n−1], and the amount of change with time $\Delta YT$ of the brightness value calculated in the process in S206 are substituted for the following equation to calculate the estimated value Y[n] of the brightness of a predetermined area in the image D[n].

$$Y[n] = Y[n-1] + (\Delta YT \times FT[n])$$

The estimated value Y[n] is an estimation result of a change with time of the amount of light of a luminous flux by fading in the fluorescent observation sample after pumping.

In the equation above, Y[0] is set to the brightness value Yb calculated in the process in S205 and FT[1] is set to a set value of the time from starting the exposure for shooting the image Db to starting the next exposure for shooting the image D[1] by the shooting unit in the process in S205.

Next, in S210, the shooting condition setting control unit 183 of the control unit 18 performs the exposure time setting control process. This process is to obtain the exposure time TEXP=ET[n] as appropriate exposure for the brightness value Y[n] and set it in the shooting unit. The shooting condition setting control unit 183 refers to the above-mentioned data table indicating the relationship between the brightness value Y and the exposure time T as appropriate exposure, and retrieves the value associated with the brightness value Y[n] in the data table, thereby obtaining the exposure time ET[n].

Then, the shooting process is performed in S211. In the shooting process, the shooting unit and the image processing unit 16 are controlled, the shooting unit shoots a subject with the exposure time $T_{EXP}$=ET[n], and the record unit 17 records the image D[n] obtained in the shooting process.

In the shooting process, on the basis of the time FT[n] set in S209, the exposure for shooting the image D[n] is started. In addition, in the shooting process, the brightness value calculation unit 162 is operated to calculate an actual value of the brightness value Y[n] of a predetermined area (same area as the area in which the brightness value Ya is calculated from the image Da) in the image D[n], and an obtained value is recorded in the record unit 17.

Next, in S212, the current value of the variable n is incremented by 1.

Then, in S213, it is determined whether or not the current value of the variable n is the number m of images set in S201 or less. If the current value of the variable n is m or less (when the determination result is YES), control is returned to S208, and the process of shooting the image D[n] is performed. On the other hand, if it is determined that the current value of the variable n exceeds m (when determination result is NO), control is passed to the process in S214.

Next, in S214, the combination unit 161 is operated to read each of the images D[1] through D[m] from the record unit 17, combine them as described above, perform the process of generating a high-resolution image of a subject with the resolution higher than those of the images, and afterwards terminate the process in FIG. 3.

When the control unit 18 performs the above-mentioned controlling process, a high-resolution image of a sample as a subject can be obtained by the microscope system in FIG. 1. The prediction unit 182 estimates a change with time by fading on the fluorescent observation sample after pumping for the amount of light entering the image pickup device 11 on the basis of the change of the brightness values of at least two images obtained by the shooting process by the shooting unit and the shooting interval of the image by the shooting unit. Then, the shooting condition setting control unit 183 controls the setting of the exposure (practically the exposure time) when the shooting unit afterwards shoots an image of a subject image on the basis of the result of the prediction of the change with time of the amount of light of the luminous flux by the prediction unit 182. Therefore, when the shooting unit afterwards shoots an image of a subject image, the shooting operation can be set with appropriate exposure. Accordingly, the quality of the high-resolution image of the subject image generated by the combination unit 161 can me improved.

As described above, in the microscope system in FIG. 1, the prediction unit 182 predicts a shooting environment when the shooting unit afterwards shoots an image of a subject image on the basis of at least two images obtained by the shooting process performed by the shooting unit. Then, the shooting condition setting control unit 183 controls the setting of the shooting condition when the shooting unit shoots an image of the subject image of the shooting unit on the basis of the result of the prediction of the shooting environment by the prediction unit 182. Therefore, in the microscope system in FIG. 1, a shooting process can be performed with the setting of an appropriate shooting condition in each shooting process although a plurality of images to be used in generating a high-resolution image in a pixel shifting method cannot be simultaneously shot. As a result, an appropriate high-resolution image can be obtained in a pixel shifting method for a subject whose aspect changes with the lapse of time.

In the microscope system in FIG. 1, the amount of change with time $\Delta YT$ of a brightness value may be calculated on the basis of two images Da and Db, and more images.

In the microscope system in FIG. 1, the images Da and Db as the bases of the amount of change with time $\Delta YT$ of a brightness value, and the images D[1] through D[m] used in generating a high-resolution image are separately shot. Instead, one of the images Da and Db can be used as an image D[1] to generate a high-resolution image. However, in this case, for example, a brightness value when an image to be used is shot is set as a target brightness value. When another image for use in generating a high-resolution image is shot, the setting of exposure time is controlled for appropriate exposure of the target brightness value. Furthermore, the image processing unit 16 performs an image processing for enhancing the brightness of the images so that the brightness value to be calculated on the basis of the image obtained by the shooting process can be a target brightness value. Thus, the number of images shot until completing generating a high-resolution image can be reduced by one.

In the system in FIG. 1, the amplification level of the amplifier unit 14 is controlled so that the level matches the brightness value of the image when it is captured with predicted exposure time, or the control of the image processing for enhancing the brightness of the image by the image processing unit 16 is performed while fixing the exposure time.

In the above-mentioned controlling process, the brightness estimate is calculated on the basis of the FT[n]. If the microscope body 10 uses a light source whose illumination state is variable such as LED illustration etc. and the image pickup device 11 is provided with a shutter, and a shading process is performed from the end of the exposure of the (n−1)th image to the start of the exposure of the n-th image, then the following process is performed. That is, using the time (during which the light from the light source is emitted to a sample) obtained by subtracting the shading time from the time FT[n], the brightness estimate can be calculated.

In the system illustrated in FIG. 1, the amount of change with time $\Delta YT$ of the brightness is calculated from a plurality of images. If the amount of change with time by the fading of a sample is obtained, the exposure time can be predicted using the amount of change with time of the fading.

Described below is the example in FIG. 4. FIG. 4 is the second example of the configuration of the microscope system embodying the present invention.

In FIG. 4, a component having the same function as the first example in FIG. 1 is assigned the same reference numeral. Since the components are described above, the detailed explanation is omitted here.

The configuration in FIG. 4 is different from the configuration in FIG. 1 in that an operation unit 31 is added and the control unit 18 is also provided with an exposure time comparison unit 301.

By a user of the microscope system operating the operation unit 31, the operation unit 31 acquires an instruction from the user associated with the operation, and transmits the instruction to the control unit 18. The operation unit 31 specifically acquires an instruction about the exposure time from the user. The function of the operation unit 31 can be provided by an input device (keyboard device etc.) of a PC connected to the microscope system.

The exposure time comparison unit 301 compares the setting of the exposure time by the control of the shooting condition setting control unit 183 with a predetermined time threshold, that is, the exposure time relating to the instruction acquired by the operation unit 31.

In the system in FIG. 4, if the setting of the exposure time by the control of the shooting condition setting control unit 183 exceeds the above-mentioned time threshold as a result of the comparison by the exposure time comparison unit 301, the shooting condition setting control unit 183 also controls the setting of the amplification level of the amplifier unit 14.

Figure 5:
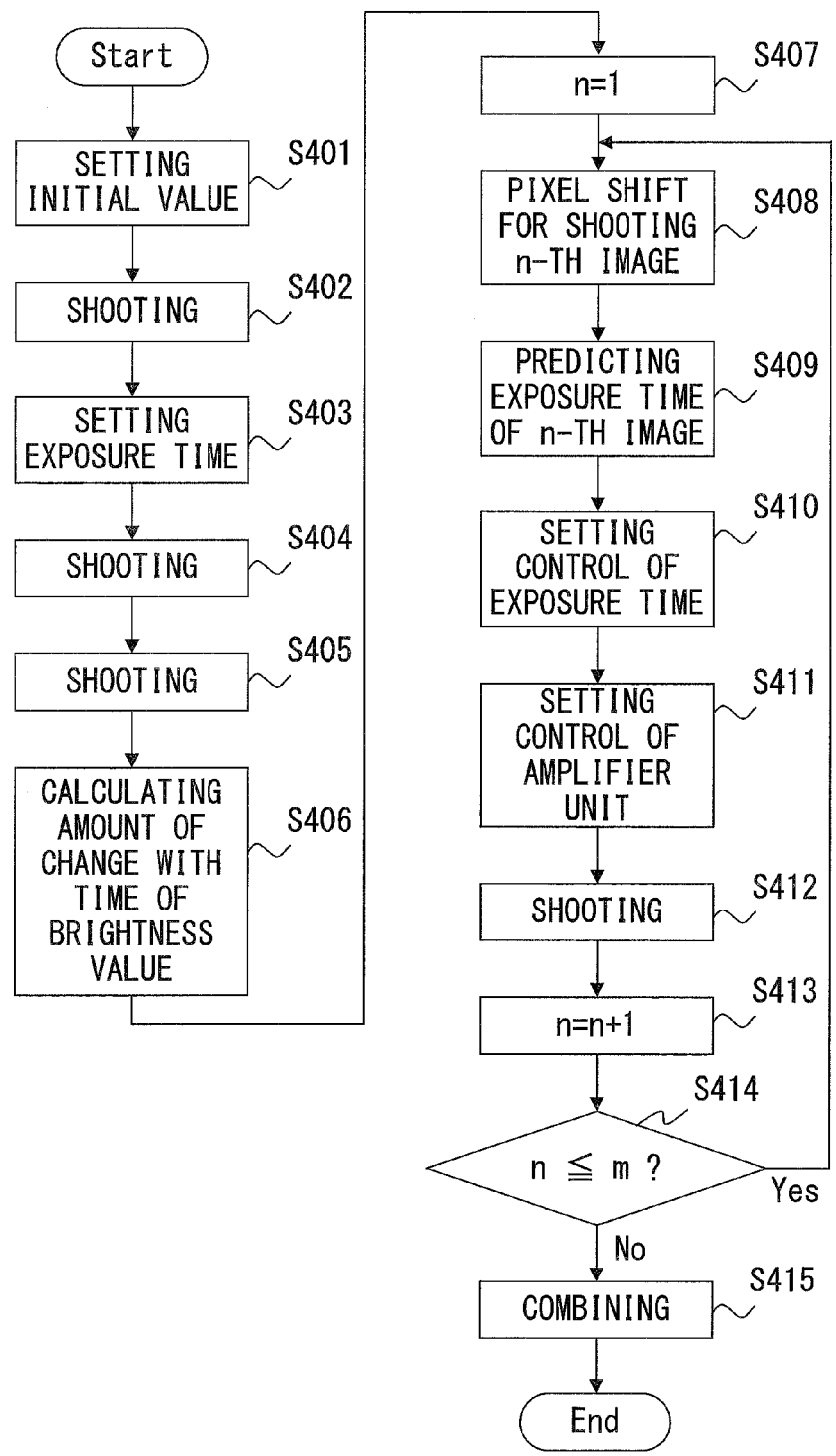
FIG. 5 is a flowchart of the process contents of the first example of the controlling process performed by the control unit in FIG. 4.

Described below is the flowchart illustrated in FIG. 5. FIG. 5 is a flowchart of the process of the first example of the controlling process performed by the control unit 18 in FIG. 4.

In the flowchart in FIG. 5, each process from S401 to S410 and from S412 to S415 is the same as each process from S201 to S214 in the flowchart in FIG. 1. In this example, the process in S411 is described, and the detailed explanation of other processes is omitted here.

After the process in S410, an amplifier unit setting control process is performed in S411. In this process, first, the exposure time comparison unit 301 compares the length of the exposure time $T_{EXP}$=ET[n] set in the shooting unit by the shooting condition setting control unit 183 in S410 with the length of the maximum exposure time $T_{max}$ indicated by a user. As a result, only when ET[n] is longer than $T_{max}$, the shooting condition setting control unit 183 controls the setting of the exposure time of the shooting unit to limit it to $T_{max}$, and controls the setting of the amplification level of the amplifier unit 14 to increase the amplification level on the basis of the ratio of $T_{max}$ to ET[n]. Then, control is passed to S412.

As described above, in addition to the configuration in FIG. 1 in the microscope system in FIG. 4, the exposure time comparison unit 301 compares the setting of the exposure time under the control of the shooting condition setting control unit 183 with a predetermined time threshold. If the setting of the exposure time exceeds the time threshold, the shooting condition setting control unit 183 also controls the setting of the amplification level of the amplifier unit 14 in addition to the shooting unit. By the control, the amplification level of the amplifier unit 14 can be increased on the basis of the ratio of the set value of the exposure time to the time threshold, and the setting of the exposure time of the shooting unit is limited to the time threshold. In the microscope system in FIG. 4, the above-mentioned process acquires the effect similar to the system in FIG. 1, and although the sample to be observed is dark the exposure time of shooting an image is not longer than a predetermined time. Therefore, the time required from the start of shooting to the generation of a high-resolution image can be prevented from being abnormally long, thereby reducing the load of an observer. Furthermore, since the exposure time of shooting an image is limited, fluorescent pumping for a fluorescent observation sample can be reduced, thereby delaying the change with time of fading the sample.

In the system in FIG. 4, when the shooting condition setting control unit 183 controls the setting of the amplification level of the amplifier unit 14 in a predetermined condition. Instead, the image processing unit 16 can control the image processing to, enhance the amplification level of the amplifier unit 14.

In the case in the controlling process in FIG. 5, the shooting condition setting control unit 183 controls the setting of the exposure time of the shooting unit to limit it to $T_{max}$, and also controls the setting of the amplification level of the amplifier unit 14. Instead, the setting of the exposure time of the shooting unit can be controlled to limit the time to be shorter than $T_{max}$ and the setting of the amplification level of the amplifier unit 14 can be controlled to increase the amplification level on the basis of the ratio of $T_{max}$ to the time after the limiting process.

Figure 6:
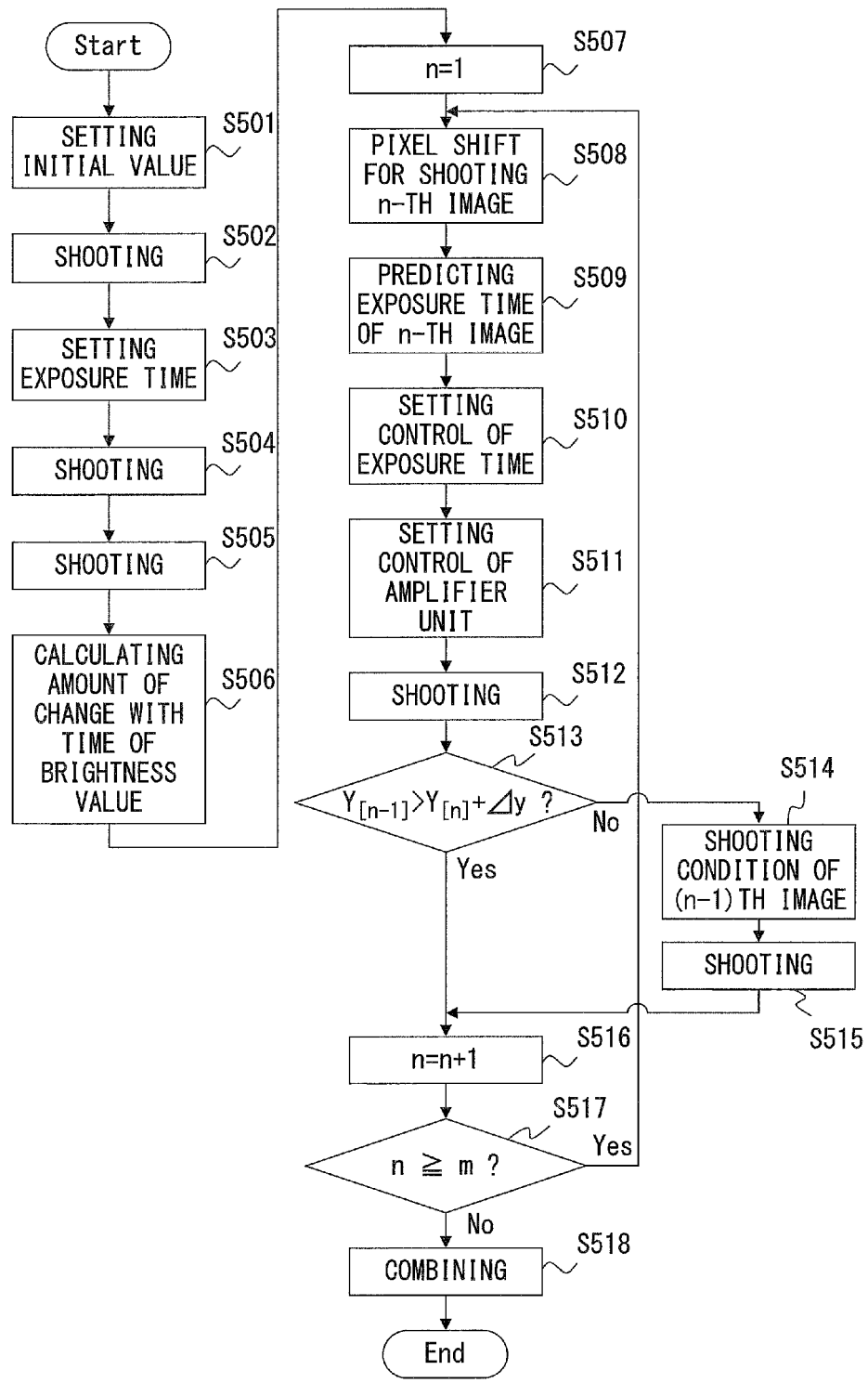
FIG. 6 is a flowchart of the process contents of the second example of the controlling process performed by the control unit in FIG. 4.

Next, the flowchart in FIG. 6 is described below. FIG. 6 is a flowchart of the process of the second example of the controlling process performed by the control unit 18 in FIG. 4.

If the control unit 18 performs the controlling process in FIG. 6, the shooting condition setting control unit 183 first determines whether or not the reduction of the brightness value in the two images continuously shot by the shooting unit under the shooting condition setting control unit 183 is within a predetermined change threshold. If it is determined that the reduction of the brightness value in the two images is within the predetermined change threshold, the shooting condition setting control unit 183 reproduces the setting of the same shooting condition as in shooting the first shot image in the two continuous images. Under the setting of the reproduced shooting condition, the shooting unit is controlled, and the last shot image in the two continuous images is shot again.

In the flowchart in FIG. 6, each process from S501 to S512 and from S516 to S518 except S513 through S515 is the same process from S401 to S415 in the flowchart in FIG. 5. In this example, the processes from S513 to S515 are described below, and the detailed explanation is omitted for other processes.

After the process in S512, the shooting condition setting control unit 183 performs the determining process in S513.

In this determining process, first in the shooting process in S512, the actual value of the brightness value Y[n] recorded with the image D[n] shot immediately before, and the actual value of the brightness value Y[n−1] recorded with the image D[n−1] shot immediately before the above-mentioned actual value are read from the record unit 17. Then, a change threshold of the brightness value set in advance is defined as Δy, and a comparison is made between Y[n−1] and Y[n]+Δy.

In the determining process, if it is determined that Y[n−1] is larger than Y[n]+Δy, (when the determination result is YES), it is assumed that the fading of the fluorescent observation sample has not been saturated, and control is passed to S515. On the other hand, if it is determined that Y[n−1] is equal to or less than Y[n]+Δy (when the determination result is NO), it is assumed that the fading of the fluorescent observation sample has been saturated, and control is passed to S514.

In S514, the process of controlling and reproducing the settings of the exposure time of the shooting unit and the amplification level of the amplifier unit 14 so that the same shooting condition as in shooting the image D[n−1] on the shooting unit can be obtained is performed by the shooting condition setting control unit 183.

Next, in S515, a shooting process is performed. In the shooting process, the shooting unit and the image processing unit 16 are controlled to shoot a subject on the shooting unit under the same shooting condition as in shooting the image D[n−1], and the image D[n] obtained by the shooting process is recorded on the record unit 17 instead of the image recorded in the process in S512. When the shooting process is completed, control is passed to S516.

As described above, in the microscope system in FIG. 4, the same effect as in the system illustrated in FIG. 1 can be obtained by allowing the control unit 18 to perform the controlling process in FIG. 6, and also the same effect as in allowing the control unit 18 to perform the controlling process in FIG. 5 can be obtained. Furthermore, by allowing the control unit 18 to perform the controlling process in FIG. 6, the shooting condition setting control unit 183 reproduces the setting of the same shooting condition as in shooting the first shot image in two images if the reduction of the brightness value in the continuously shot images by the shooting unit is within a predetermined change threshold. Under the reproduced setting of the shooting condition, the shooting unit is controlled and the image of the last shot image in the continuous two images is reproduced. Therefore, by the operation above, the fading of the fluorescent observation sample is saturated, and when there is no change in the brightness value in time, an image used in generating a high-resolution image is obtained in a more appropriate state, thereby improving the quality of the generated high-resolution image.

In the controlling process in FIG. 6, although it is assumed that the fading of a fluorescent observation sample has been saturated, the change with time of the amount of light of the luminous flux for the shooting of and after the image D [n+1] is predicted. Instead, when it is assumed that the fading of the fluorescent observation sample has been saturated, the shooting of and after the image D[n+1] can be totally performed by the shooting unit under the same shooting condition as in shooting the image D[n−1].

The present invention is not limited to the embodiments above, but can be variously amended within the scope of the present invention in the embodying stages.

For example, in each of the above-mentioned embodiments, the amount of change with time ΔYT of the brightness value is calculated from the brightness values Ya and Yb of a predetermined area in the images Da and Db. Instead, the following processes can also be performed.

Figure 7:
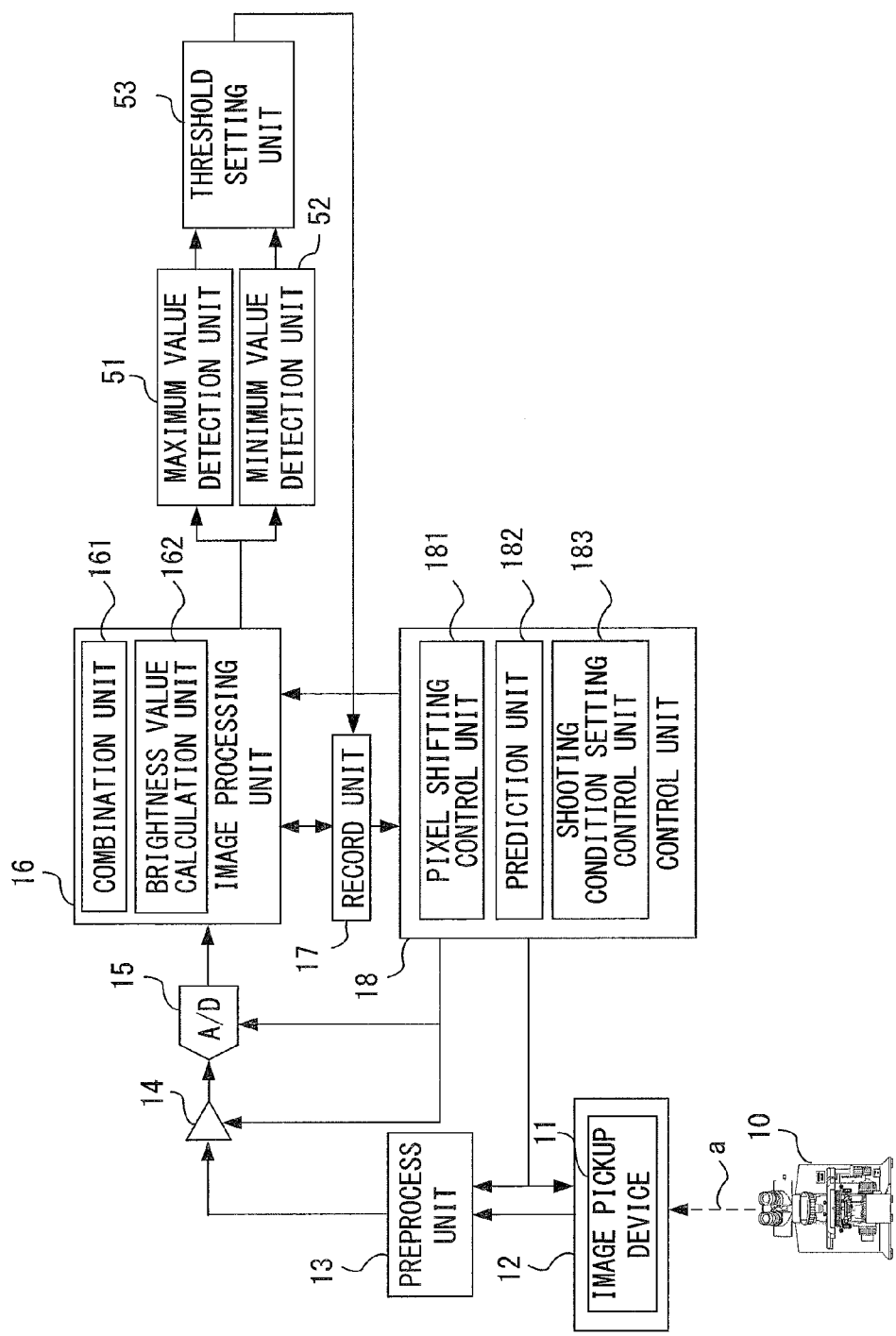
FIG. 7 is the third example of the configuration of the microscope system embodying the present invention.

Described below is the example illustrated in FIG. 7. FIG. 7 is the third example of the configuration of the microscope system embodying the present invention.

In FIG. 7, the component having the same function as the first example illustrated in FIG. 1 is assigned the same reference numeral. These components are described above, and the detailed explanation is omitted here.

The configuration in FIG. 7 is different from the configuration in FIG. 1 only in that a maximum value detection unit 51, a minimum value detection unit 52, and a threshold setting unit 53 are added.

The maximum value detection unit 51 detects the maximum value Pmax_n of the brightness value of the pixel in each of a plurality of images shot by the shooting unit. The minimum value detection unit 52 detects the minimum value Pmin_n of the brightness value of the predetermined area in each of the plurality of images.

The threshold setting unit 53 sets the brightness value threshold Pth_n by the following equation using the above-mentioned Pmax_n, Pmin_n, and the coefficient β set in advance.

$$Pth\_n = \beta \cdot Pmax\_n + (1-\beta) \cdot Pmin\_n$$

The value of the coefficient β is expressed by $0 \leq \beta \leq 1$, obtained experimentally or empirically.

Described below is the example illustrated in FIG. 8. FIG. 8 is an example of the relationship between the brightness value of the pixel configuring an image and the number of pixels as the brightness value in a certain image. In FIG. 8, the horizontal axis indicates the brightness value, and the vertical axis indicates the number of pixels. In FIG. 8, the above-mentioned Pmax_n, Pmin_n, and Pth_n have the illustrated relationship.

With the configuration in FIG. 1, the prediction unit 182 calculates the amount of change with time ΔYT of the brightness value from the brightness values Ya and Yb of a predetermined area of each of the images Da and Db. On the other hand, with the configuration in FIG. 7, the prediction unit 182 calculates the amount of change with time ΔYT of the brightness value from the average brightness values Ypthoa and Ypthob for the pixel having the brightness value of or over the brightness value threshold Pth_n in each of the images Da and Db.

The control unit 18 in FIG. 7 performs the controlling process illustrated in FIG. 3. However, in the shooting process in S205, the threshold setting unit 53 calculates the average brightness values Ypthoa and Ypthob and directs the record unit 17 to record the values. In the process of calculating the amount of change with time of the brightness value in S206, the prediction unit 182 first reads the average brightness values Ypthoa and Ypthob from the record unit, and calculates the amount of change ΔY=Ypthoa−Ypthob of the brightness values of them. Next, the amount of change ΔY of the brightness value is divided by the above-mentioned shooting interval time t, and calculates the amount of change with time ΔYT=ΔY/t of the brightness value 2.

Thus, in the system in FIG. 7, the prediction unit 182 predicts the change with time of the amount of light of the luminous flux from the change of the average brightness value about a pixel whose brightness value is a predetermined brightness value threshold or more in each of at least two images and the shooting interval of the images by the shooting unit. By the prediction, an appropriate high-resolution image can be generated in the pixel shifting method on the subject whose aspect changes with the lapse of time.

With the configuration in FIG. 4, a similar effect can be obtained by adding the maximum value detection unit 51, the minimum value detection unit 52, and the threshold setting unit 53 so that the 182 can predict the change with time of the amount of light of the luminous flux as described above.

Furthermore, the target of the determining process in S513 illustrated in FIG. 6 can be the average brightness value Yptho[n] for the image D[n] and the average brightness value Yptho[n−1] for the image D[n−1].

That is, in the determining process in S513, the average brightness value Yptho[n−1] is compared with the average brightness value Yptho[n]+y. If it is determined in the determining process that Yptho[n−1] is larger than Yptho[n]+y (the determination result is YES), it is assumed that the fading of the fluorescent observation sample has not been saturated, and control is passed to S515. On the other hand, if it is determined that Yptho[n−1] is equal to or smaller than Yptho[n]+y (the determination result is NO), it is assumed that the fading of the fluorescent observation sample has been saturated, and control is passed to S514.

Thus, when the process is changed, it is determined whether or not the reduction of the average brightness value of the pixel whose brightness value in each of the two continuous images is equal to or larger than a predetermined brightness value threshold. In this case, if it is determined that the reduction of the average brightness value is within a predetermined change threshold, the same setting of the shooting condition as in shooting the previously shot image is reproduced. Then, the shooting unit is controlled under the setting of the reproduced shooting condition, and the last shot image in the two continuous images is re-shot. The controlling operation is performed by the control unit 18. In this process, an appropriate high-resolution image can be generated in the pixel shifting method for a subject whose aspect changes with the lapse of time.

What is claimed is:
1. An image acquisition apparatus, comprising:
a combination unit;
a record unit;
a preprocess unit;
an analog/digital unit;
a pixel shifting unit, implemented at least in part by hardware, moving a relative position between a luminous flux entering an image pickup device and the image pickup device to a plurality of predetermined positions in a predetermined order;
a shooting unit, implemented at least in part by hardware, shooting an image of a subject image formed by the luminous flux on a photoreception surface of the image pickup device when the relative position is placed in any of the plurality of predetermined positions;
a high-resolution image generation unit combining a plurality of images obtained by shooting the images by the shooting unit and generating a high-resolution image of the subject having higher resolution than the images;
a prediction unit predicting a shooting environment when the shooting unit afterwards shoots the images of the subject on a basis of a change of at least two images obtained by shooting the images by the shooting unit; and a shooting condition setting control unit controlling a setting of a shooting condition when the shooting unit shoots an image of the subject image on a basis of a result of predicting the shooting environment by the prediction unit;
the shooting condition setting control unit further comprises:
a determination unit determining whether or not a reduction of a brightness value in two images continuously shot by the shooting unit under control of the shooting condition setting control unit is within a predetermined change threshold;
a shooting condition setting reproduction unit reproducing a setting of a same shooting condition as in shooting a first shot image in the two continuous images when the determination unit determines that a reduction of a brightness value in the two images is within the predetermined change threshold; and
a reshooting control unit controlling reshooting of the shooting unit under a setting of a shooting condition reproduced by the shooting condition setting reproduction unit, and reshooting a last shot image in the two continuous images;
wherein the subject is a fluorescent observation sample; and
the prediction unit predicting a change with time of the amount of light of the luminous flux by fading on the fluorescent observation sample after pumping on a basis of a change of a brightness value in at least two images and a shooting interval of the image by the shooting unit.

2. The apparatus according to claim 1, wherein:
the prediction unit predicts an amount of light of the luminous flux when the shooting unit hereafter shoots an image of the subject image; and
the shooting condition setting control unit controls a setting of exposure when the shooting unit hereafter shoots an image of the subject image.

3. The apparatus according to claim 1, wherein:
the shooting condition setting control unit controls a setting of exposure time during shooting by the shooting unit as control of a setting of the exposure;
the shooting unit comprises an amplifier unit amplifying a signal representing an image of the subject image as an output signal of the image pickup device, and outputs the signal amplified by the amplifier unit as a shooting result of the image of the subject image by the shooting unit; and
the shooting condition setting control unit also controls a setting of an amplification level when the amplifier unit amplifies the signal if a setting of exposure time by the control exceeds a predetermined time threshold.

4. The apparatus according to claim 1, wherein
the prediction unit predicts a change with time of the amount of light of the luminous flux by fading on the fluorescent observation sample after pumping on a basis of a change of an average brightness value of pixels whose brightness values are equal to or exceed a predetermined brightness value threshold in at least the two images and a shooting interval of the image by the shooting unit.

5. The apparatus according to claim 1, wherein
the determination unit determines whether or not a reduction of an average brightness value of pixels whose brightness values are equal to or exceed a predetermined brightness value threshold in each of the two continuous images is within a predetermined change threshold; and the shooting condition setting reproduction unit reproduces a setting of the same shooting condition when the determination unit determines that the reduction of the average brightness value in each of the two continuous images is within the predetermined change threshold.

6. A control method for an image acquisition apparatus, the method comprising:
- moving, by a hardware pixel shifting unit of an image acquisition apparatus, a relative position between a luminous flux entering an image pickup device and the image pickup device to a plurality of predetermined positions in a predetermined order, the image acquisition apparatus, comprising: a combination unit, a record unit, a preprocess unit, and an analog/digital unit;
- shooting, by a hardware shooting unit of the image acquisition apparatus, an image of a subject image formed by the luminous flux on a photoreception surface of the image pickup device when the relative position is placed in any of the plurality of predetermined positions; and
- combining, by a high-resolution image generation unit of the image acquisition apparatus, a plurality of images obtained by shooting the images by the shooting unit and generating a high-resolution image of the subject having higher resolution than the images;
- predicting, by a prediction unit of the image acquisition apparatus, a shooting environment when the shooting unit afterwards shoots the images of the subject on a basis of a change of at least two images obtained by shooting the images by the shooting unit;
- controlling, by a shooting condition setting control unit of the image acquisition apparatus, a setting of a shooting condition when the shooting unit shoots an image of the subject image on a basis of a result of predicting the shooting environment;
- determining, by a determination unit of the shooting condition setting control unit, whether or not a reduction of a brightness value in two images continuously shot by the shooting unit under control of the shooting condition setting control unit is within a predetermined change threshold;
- reproducing, by a shooting condition setting reproduction unit of the shooting condition setting control unit, a setting of a same shooting condition as in shooting a first shot image in the two continuous images when the determination unit determines that a reduction of a brightness value in the two images is within the predetermined change threshold;
- controlling, by a reshooting control unit of the shooting condition setting control unit, reshooting of the shooting unit under a setting of a shooting condition reproduced by the shooting condition setting reproduction unit, and reshooting a last shot image in the two continuous images;
- wherein the subject is a fluorescent observation sample; and
- predicting, by the prediction unit of the image acquisition apparatus, a change with time of the amount of light of the luminous flux by fading on the fluorescent observation sample after pumping on a basis of a change of a brightness value in at least two images and a shooting interval of the image by the shooting unit.

7. A microscope system, comprising:
- a microscope obtaining a microscope image of a sample; and
- an image acquisition apparatus acquiring an image of the microscope image, the image acquisition apparatus, comprising:
- a combination unit;
- a record unit;
- a preprocess unit;
- an analog/digital unit;
- a pixel shifting unit, implemented at least in part by hardware, moving a relative position between a luminous flux entering an image pickup device and the image pickup device to a plurality of predetermined positions in a predetermined order;
- a shooting unit, implemented at least in part by hardware, shooting an image of a subject image formed by the luminous flux on a photoreception surface of the image pickup device when the relative position is placed in any of the plurality of predetermined positions;
- a high-resolution image generation unit combining a plurality of images obtained by shooting the images by the shooting unit and generating a high-resolution image of the subject having higher resolution than the images;
- a prediction unit predicting a shooting environment when the shooting unit afterwards shoots the images of the subject on a basis of a change of at least two images obtained by shooting the images by the shooting unit; and
- a shooting condition setting control unit controlling a setting of a shooting condition when the shooting unit shoots an image of the subject image on a basis of a result of predicting the shooting environment by the prediction unit;
- the shooting condition setting control unit further comprises:
- a determination unit determining whether or not a reduction of a brightness value in two images continuously shot by the shooting unit under control of the shooting condition setting control unit is within a predetermined change threshold;
- a shooting condition setting reproduction unit reproducing a setting of a same shooting condition as in shooting a first shot image in the two continuous images when the determination unit determines that a reduction of a brightness value in the two images is within the predetermined change threshold; and
- a reshooting control unit controlling reshooting of the shooting unit under a setting of a shooting condition reproduced by the shooting condition setting reproduction unit, and reshooting a last shot image in the two continuous images;
- wherein the subject is a fluorescent observation sample; and
- the prediction unit predicting a change with time of the amount of light of the luminous flux by fading on the fluorescent observation sample after pumping on a basis of a change of a brightness value in at least two images and a shooting interval of the image by the shooting unit.

* * * * *